US009918437B2

(12) United States Patent
Spencer

(10) Patent No.: US 9,918,437 B2
(45) Date of Patent: Mar. 20, 2018

(54) EXTRACTION DEVICE

(71) Applicant: Brian D. Spencer, Merritt Island, FL (US)

(72) Inventor: Brian D. Spencer, Merritt Island, FL (US)

(*) Notice: Subject to any disclaimer, the term of this patent is extended or adjusted under 35 U.S.C. 154(b) by 104 days.

(21) Appl. No.: 14/450,694

(22) Filed: Aug. 4, 2014

(65) Prior Publication Data

US 2016/0032614 A1 Feb. 4, 2016

(51) Int. Cl.
*A01G 23/06* (2006.01)
*E04H 17/26* (2006.01)

(52) U.S. Cl.
CPC ......... *A01G 23/062* (2013.01); *A01G 23/065* (2013.01); *E04H 17/265* (2013.01)

(58) Field of Classification Search
CPC ..... E04H 17/265; A61G 7/1051; B66F 15/00; A01G 23/062; A01G 23/065
See application file for complete search history.

(56) References Cited

U.S. PATENT DOCUMENTS

| 124,721 | A | * | 3/1872 | Clement | B66F 15/00 |
| | | | | | 254/130 |
| 218,725 | A | * | 8/1879 | Frederick | F16G 11/12 |
| | | | | | 254/132 |
| 236,829 | A | * | 1/1881 | Merchant | A01G 23/062 |
| | | | | | 254/214 |
| 336,189 | A | * | 2/1886 | White | B66C 23/66 |
| | | | | | 212/232 |
| 855,626 | A | * | 6/1907 | Furru | B61H 15/0085 |
| | | | | | 74/522 |
| 1,214,104 | A | * | 1/1917 | Wingire | B66C 5/025 |
| | | | | | 254/334 |
| 1,523,061 | A | * | 1/1925 | Fauth | F16G 11/12 |
| | | | | | 254/226 |
| 3,048,368 | A | * | 8/1962 | Linabery, Sr. | E04H 17/265 |
| | | | | | 254/130 |
| 3,520,514 | A | * | 7/1970 | Evans | B66C 19/02 |
| | | | | | 104/126 |
| 3,526,387 | A | * | 9/1970 | Fleming | E02D 9/02 |
| | | | | | 254/132 |
| 3,559,913 | A | * | 2/1971 | Hajduk | B65H 75/403 |
| | | | | | 242/379.2 |
| 3,657,786 | A | * | 4/1972 | Wiswell, Jr. | F16L 1/09 |
| | | | | | 29/237 |

(Continued)

FOREIGN PATENT DOCUMENTS

GB 2155881 A * 10/1985 ............. B63B 21/50

*Primary Examiner* — Michael E Gallion

(57) ABSTRACT

An extraction device eases the task of removing a post, bush or the like from a ground surface. The device includes a pair of legs pivotally coupled together at respective first ends of the legs. A bar is pivotally coupled to a first one of the pair of legs. The bar has a notch extending upwardly into a bottom edge of the bar. A projection is coupled to a second one of the legs. The projection is insertable into the notch to secure the legs in a static position relative to each other. A connector is coupled to an associated one of the legs proximate the first end of the pair of legs. A ratcheting mechanism is removably coupled to the connector. A cable is removably coupled to the ratcheting mechanism for extending around a structural object for removing the structural object from the ground surface.

7 Claims, 4 Drawing Sheets

(56) References Cited

U.S. PATENT DOCUMENTS

| | | | | |
|---|---|---|---|---|
| 3,985,204 A * | 10/1976 | Lattig | A01M 31/02 182/223 |
| 4,250,769 A * | 2/1981 | Herring | A01G 17/16 254/129 |
| 4,296,509 A * | 10/1981 | Simmons | A61G 7/1015 248/168 |
| 4,327,534 A * | 5/1982 | Mastalski | E04H 12/34 254/30 |
| 4,365,786 A * | 12/1982 | Osteen | B66F 15/00 254/129 |
| 4,708,048 A * | 11/1987 | Brown | F41A 9/01 104/126 |
| 4,804,165 A * | 2/1989 | Pippin | E01B 29/26 254/132 |
| D300,801 S | 4/1989 | Pollard | |
| 4,852,836 A * | 8/1989 | Kawazoe | F16M 11/32 248/168 |
| 5,016,300 A * | 5/1991 | Jandrakovic | A61G 7/1015 254/394 |
| 5,060,410 A * | 10/1991 | Mueller | F16M 11/08 42/94 |
| 5,186,437 A * | 2/1993 | Scott | B66F 15/00 254/132 |
| 5,284,324 A * | 2/1994 | Bunger | B66C 1/663 248/132 |
| 5,413,347 A * | 5/1995 | Prater | A63B 69/0084 473/147 |
| 5,505,433 A * | 4/1996 | Carmichael | A47G 27/0487 156/763 |
| 5,713,559 A * | 2/1998 | McClarin | B66F 15/00 254/124 |
| 5,809,591 A * | 9/1998 | Capaldi | A61G 7/1015 5/83.1 |
| 5,934,649 A * | 8/1999 | Drane | B66F 15/00 254/120 |
| 6,024,318 A * | 2/2000 | Barry | A01K 97/01 242/396.9 |
| 6,131,884 A * | 10/2000 | Broussard | E04H 17/265 254/129 |
| 6,257,555 B1 * | 7/2001 | Barbara | B66D 3/14 248/163.1 |
| 6,398,188 B1 * | 6/2002 | Salman | E04H 17/265 254/30 |
| 6,527,250 B1 * | 3/2003 | Tyson | E04H 17/265 254/30 |
| 6,595,490 B1 * | 7/2003 | Harrah | B66F 1/06 242/392 |
| 6,637,610 B1 * | 10/2003 | Cheeseboro | A61G 7/1015 212/324 |
| 6,910,664 B2 * | 6/2005 | Bolinder | E04H 12/2215 248/156 |
| 6,976,670 B1 * | 12/2005 | Woolley | E04H 17/265 254/133 R |
| 7,097,157 B1 * | 8/2006 | Lodrick | B66D 3/18 211/105.4 |
| 7,125,000 B1 * | 10/2006 | Saavedra | E04H 17/265 254/30 |
| 7,137,616 B2 * | 11/2006 | Kysely | E04H 17/265 254/30 |
| D599,166 S * | 9/2009 | Knypstra | D7/403 |
| 7,611,129 B1 * | 11/2009 | Stahm | E02D 33/00 254/243 |
| 7,658,369 B2 | 2/2010 | Baldwin | |
| 8,286,281 B1 * | 10/2012 | Toothman | A61G 7/1015 248/166 |
| 8,522,412 B1 * | 9/2013 | Walker | B25B 27/02 254/133 R |
| 2008/0164446 A1 * | 7/2008 | Baldwin | E04H 17/265 254/30 |
| 2010/0301289 A1 | 12/2010 | Rivard | |
| 2012/0074362 A1 * | 3/2012 | Sanchez | E04H 17/265 254/30 |
| 2012/0174315 A1 * | 7/2012 | Gurinowitsch | A61G 7/1015 5/83.1 |
| 2013/0048928 A1 * | 2/2013 | Bitner | E04H 17/265 254/231 |
| 2013/0343862 A1 * | 12/2013 | Tindall | A61G 3/062 414/809 |
| 2015/0028147 A1 * | 1/2015 | Rich | B65H 57/14 242/399.2 |

* cited by examiner

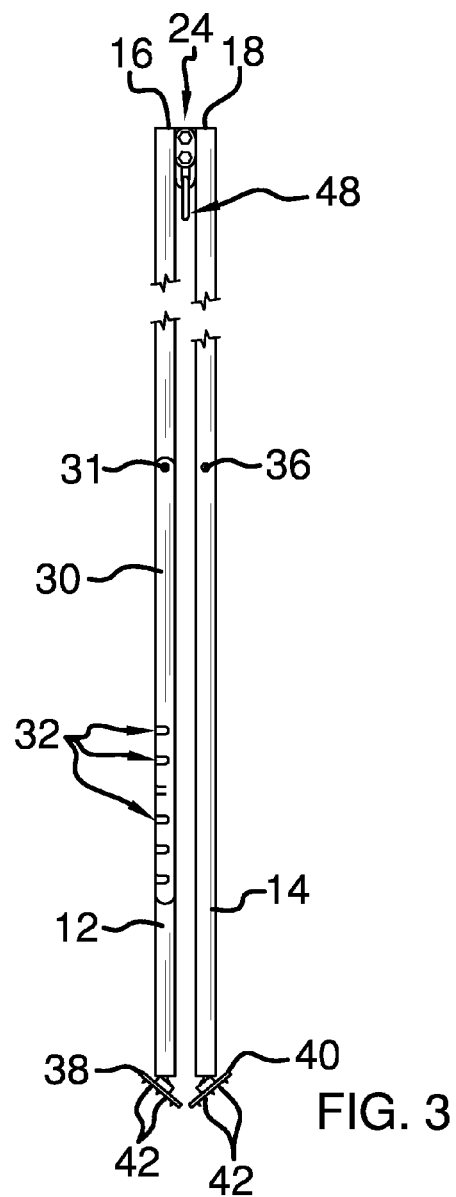
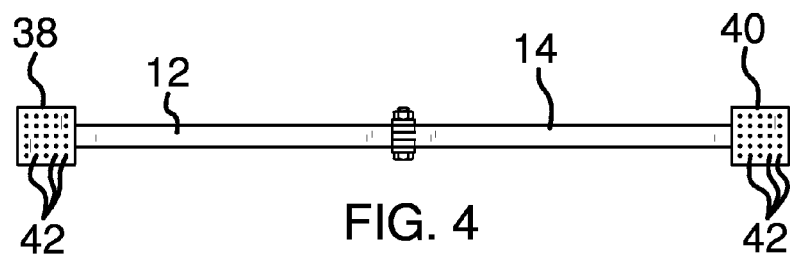

EXTRACTION DEVICE

BACKGROUND OF THE DISCLOSURE

Field of the Disclosure

The disclosure relates to lifting devices and more particularly pertains to a new lifting device for easing the task of removing a post, bush or the like from a ground surface.

SUMMARY OF THE DISCLOSURE

An embodiment of the disclosure meets the needs presented above by generally comprising a pair of legs pivotally coupled together at respective first ends of the legs. A bar is pivotally coupled to a first one of the pair of legs. The bar has a notch extending upwardly into a bottom edge of the bar. A projection is coupled to a second one of the legs. The projection is insertable into the notch to secure the legs in a static position relative to each other. A connector is coupled to an associated one of the legs proximate the first end of the pair of legs. A ratcheting mechanism is removably coupled to the connector. A cable is removably coupled to the ratcheting mechanism and is configured for extending around a structural object for removing the structural object from the ground surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a front view of an embodiment of the disclosure similar to FIG. 2, except that FIG. 3 shows legs of the device in a storage position.

FIG. 4 is a bottom view of an embodiment of the disclosure.

DESCRIPTION OF THE PREFERRED EMBODIMENT

Figure 1:
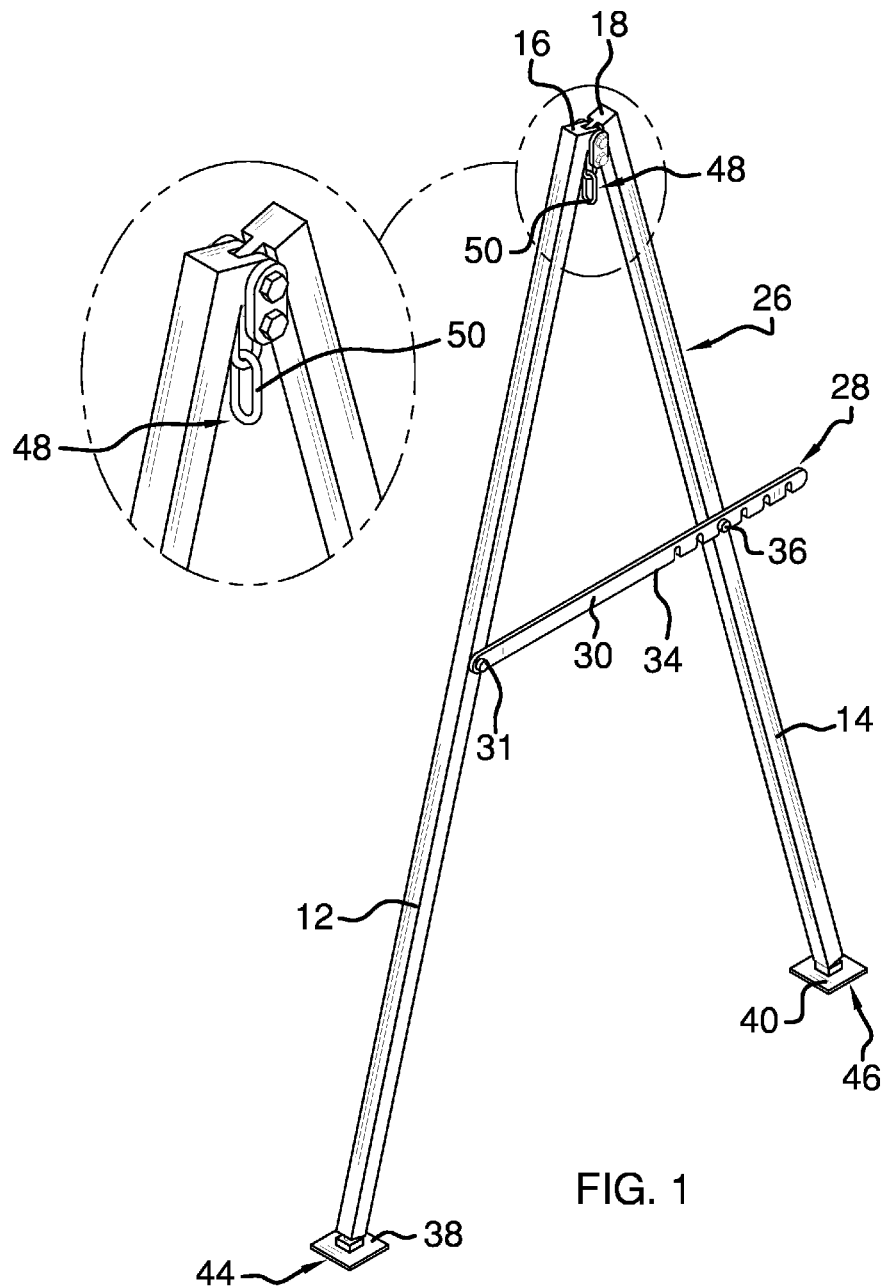
FIG. 1 is a top front side perspective view of an extraction device according to an embodiment of the disclosure.
Figure 2:
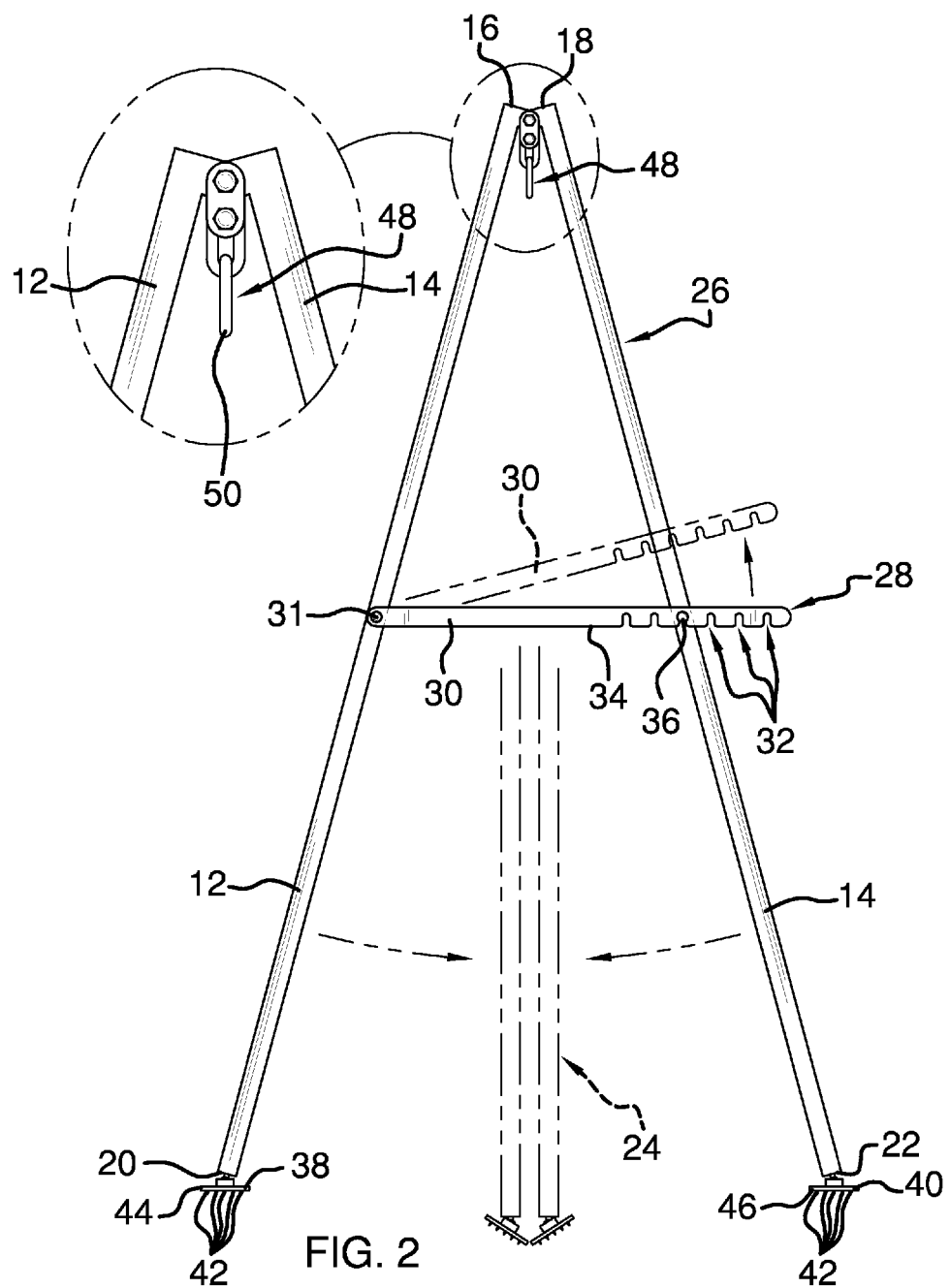
FIG. 2 is a front view of an embodiment of the disclosure.
Figure 5:
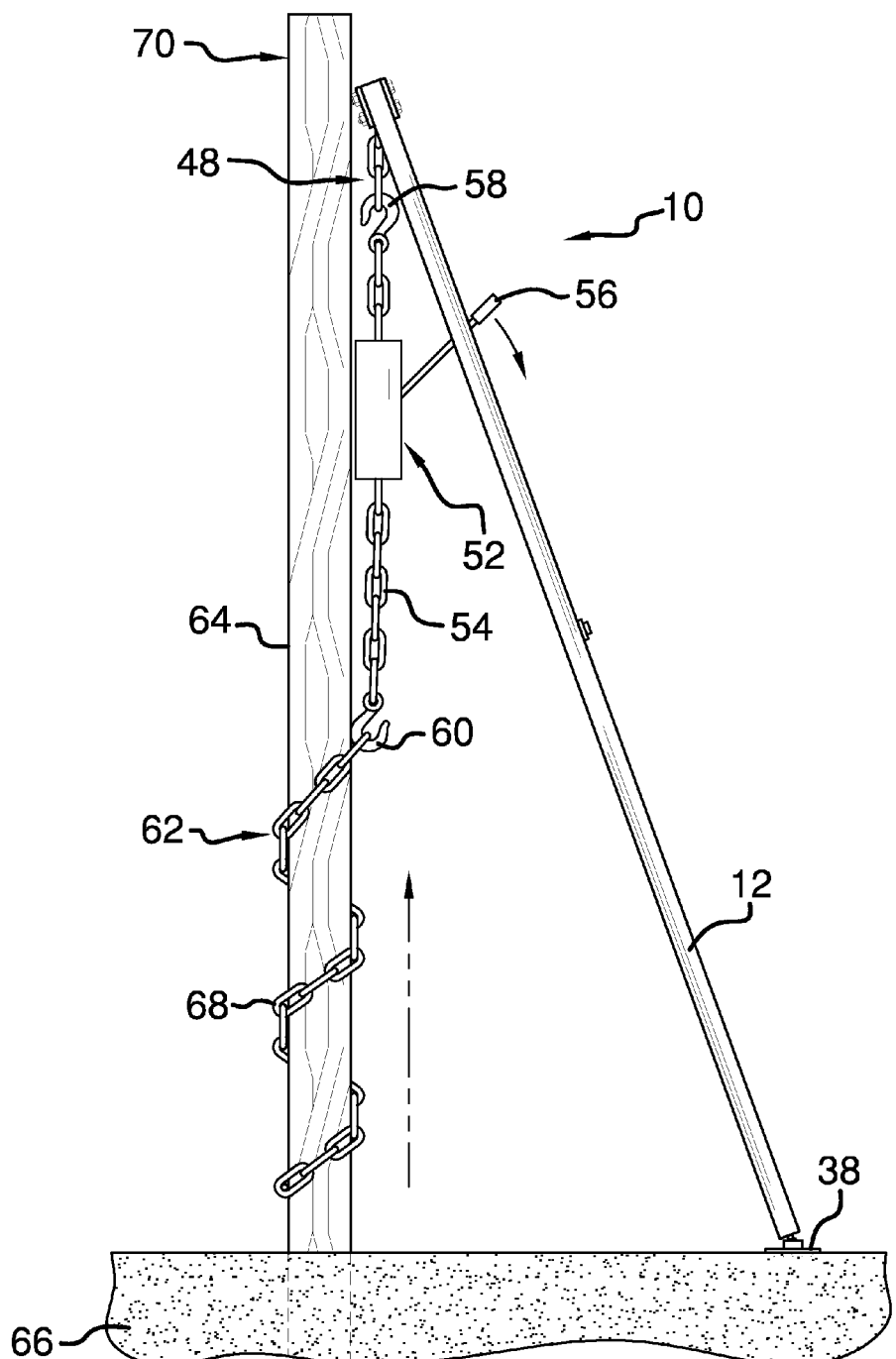
FIG. 5 is a side view of an embodiment of the disclosure in use.

With reference now to the drawings, and in particular to FIGS. 1 through 5 thereof, a new lifting device embodying the principles and concepts of an embodiment of the disclosure and generally designated by the reference numeral 10 will be described.

As best illustrated in FIGS. 1 through 5, the extraction device 10 generally comprises a pair of legs 12, 14 each having a first end 16, 18 and a second end 20, 22. The pair of legs 12, 14 is pivotally coupled together at each of the first ends 16, 18 for pivoting the legs 12, 14 between a storage position 24 and a deployed position 26. The pivotable nature of the legs 12, 14 permits the device 10 to collapse for compact storage and easy portability. Each of the legs 12, 14 may measure between approximately 150.0 cm and 180.0 cm extending between respective ones of the first 16, 18 and second 20, 22 ends of the associated leg 12, 14. Each of the legs 12, 14 is comprised of a rigid material, such as metal, hard plastic or the like.

A locking mechanism 28 is coupled to each of the legs 12, 14 for securing the legs 12, 14 in the deployed position 26. The locking mechanism 28 includes a bar 30 coupled to a first one 12 of the pair of legs 12, 14. The bar 30 is pivotable relative to the first one 12 of the pair of legs 12, 14 and is pivotable about a pivot point 31 attaching the bar 30 to the first one 12 of the pair of legs 12, 14. The bar 30 has at least one notch 32, though preferably a plurality of notches 32, extending upwardly into a bottom edge 34 of the bar 30. A projection 36 is coupled to a second one 14 of the legs 12, 14. The projection 36 is aligned with the pivot point 31 and is insertable into a selectable one of the notches 32 to secure the legs 12, 14 in a static position relative to each other. The bar 30 may have a length measuring between approximately 75.0 cm and 120.0 cm.

A pair of feet 38, 40 is provided. The second end 20, 22 of each of the legs 12, 14 has an associated one of the feet 38, 40 coupled thereto. Each of the feet 38, 40 is pivotable relative to the second end 20, 22 of the associated leg 12, 14 to facilitate placement of the feet 38, 40 on uneven terrain. A plurality of spikes 42 is coupled to a bottom surface 44, 46 of each of the feet 38, 40.

A connector 48 is coupled to and extends downwardly from an associated one of the legs 12, 14 proximate the first end 16, 18 of each of the legs 12, 14. The connector 48 may be a chain 50 comprised of a plurality of links coupled together. A ratcheting mechanism 52, which may be of conventional design and which is commonly referred to as a "come-along", is removably coupled to the connector 48. The ratcheting mechanism 52 may comprise a chain hoist having a chain 54 and may include a lever 56 for manually operating the chain hoist. Alternatively, the ratcheting mechanism 52 may be powered electrically. The ratcheting mechanism 52 further includes a first coupler 58 and a second coupler 60, which may each comprise hooks, each attached to the chain 54. The first coupler 58 is removably couplable to the connector 48 for releasably attaching the ratcheting mechanism 52 to the legs 12, 14.

A cable 62 is removably coupled to the ratcheting mechanism 52, and more particularly, is coupled to the second coupler 60. The cable 62 is configured for extending around a structural object 64 for removing the structural object 64 from a ground surface 66. The structural object 64 may include a tree stump, a post or the like. The cable 62 may be a chain 68 comprised of a plurality of links coupled together.

In use, the legs 12, 14 are pivoted to the deployed position 26 and the feet 38, 40 are placed upon a ground surface 66 adjacent to a structural object 64 that requires extraction from the ground surface 64. The bar 30 is inserted into a selectable one of the notches 32 to secure the legs 12, 14 in a static position relative to each other. Thus, the bar 30 and the various notches 32 permit the legs 12, 14 to be oriented and locked at a selectable angle relative to each other. The ratcheting mechanism 52 is secured to the connector 48, and the cable 62 is secured to the ratcheting mechanism 52. The cable 62 is wound around the structural object 64 and the ratcheting mechanism 52 is used in a conventional manner to lift the structural object 64 upwardly and outwardly out of the ground surface 66. The device 10 may be positioned so that the legs 12, 14 lean against either an upper section 70 of the structural object 64 or a wall surface positioned adjacent to the structural object 64.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An extraction device comprising:
   a single pair of legs each having a first end and a second end, said pair of legs being pivotally attached together at each of said first ends of said pair of legs wherein said legs both project outwardly from a pivot point for pivoting said legs between a storage position and a deployed position;
   a locking mechanism coupled to each of said legs whereby said legs are secured defining a constant angle relative to said pivot point and said legs remain in the deployed position, said locking mechanism including
      a bar coupled to a first one of said pair of legs, said bar being pivotable about a pivot point attaching said bar to said first one of said pair of legs, said bar having a notch extending upwardly into a bottom edge of said bar; and
      a projection coupled to a second one of said legs, said projection being aligned with said pivot point attaching said bar to said first one of said pair of legs, said projection being insertable into said notch to secure said legs in a static position relative to each other;
   a connector coupled to and extending downwardly from an associated one of said legs proximate said first end of said pair of legs;
   a ratcheting mechanism removably coupled to said connector;
   a cable removably coupled to said ratcheting mechanism, said cable being configured for extending around a structural object for removing the structural object from a ground surface; and
   a pair of feet, each of said feet having a planar section, said second end of each of said legs having an associated one of said feet coupled thereto, said planar section of each of said feet being fully rotatable and pivotable relative to said second end of said associated leg wherein each said associated leg is positionable to extend from said planar section at an angle within a selectable plane to facilitate placement of said feet on uneven terrain.

2. The device of claim 1, further comprising said notch being one of a plurality of notches each being spaced and aligned relative to each other, said projection being insertable into a selectable one of said notches.

3. The device of claim 1, further comprising a plurality of spikes coupled to a bottom surface of each of said feet.

4. The device of claim 1, further comprising said cable being a chain comprised of a plurality of links coupled together.

5. The device of claim 1, further comprising said connector being a chain comprised of a plurality of links coupled together.

6. The device of claim 1, further comprising wherein said ratcheting mechanism comprises a chain hoist.

7. An extraction device comprising:
   a pair of legs each having a first end and a second end, said pair of legs being pivotally attached together at each of said first ends of said pair of legs wherein said legs both project outwardly from a pivot point for pivoting said legs between a storage position and a deployed position;
   a locking mechanism coupled to each of said legs whereby said legs are secured defining a constant angle relative to said pivot point and said legs remain in the deployed position, said locking mechanism including
      a bar coupled to a first one of said pair of legs, said bar being pivotable about a pivot point attaching said bar to said first one of said pair of legs, said bar having a plurality of notches extending upwardly into a bottom edge of said bar; and
      a projection coupled to a second one of said legs, said projection being aligned with said pivot point attaching said bar to said first one of said pair of legs, said projection being insertable into a selectable one of said notches to secure said legs in a static position relative to each other;
   a pair of feet, each of said feet having a planar section, said second end of each of said legs having an associated one of said feet coupled thereto, said planar section of each of said feet being fully rotatable and pivotable relative to said second end of said associated leg wherein each said associated leg is positionable to extend from said planar section at an angle within a selectable plane to facilitate placement of said feet on uneven terrain;
   a plurality of spikes coupled to a bottom surface of each of said feet;
   a connector coupled to and extending downwardly from an associated one of said legs proximate said first end of said pair of legs, said connector being a chain comprised of a plurality of links coupled together;
   a ratcheting mechanism removably coupled to said connector, said ratcheting mechanism comprising a chain hoist; and
   a cable removably coupled to said ratcheting mechanism, said cable being configured for extending around a structural object for removing the structural object from a ground surface, said cable being a chain comprised of a plurality of links coupled together.

\* \* \* \* \*